United States Patent [19]
Snauwaert et al.

[11] Patent Number: 4,874,411
[45] Date of Patent: Oct. 17, 1989

[54] AIR FILTERING MECHANISM

[75] Inventors: Paul E. M. Snauwaert, Curitiba, Brazil; Geert R. J. Vergote, Izegem; Daniel C. Witdoek, Hooglede, all of Belgium

[73] Assignee: Ford New Holland, Inc., New Holland, Pa.

[21] Appl. No.: 127,996

[22] Filed: Dec. 2, 1987

[30] Foreign Application Priority Data

Dec. 5, 1986 [EP] European Pat. Off. ...... 86.202.201.9

[51] Int. Cl.$^4$ ............................................. B01D 46/38
[52] U.S. Cl. ........................................ 55/290; 55/400
[58] Field of Search ................... 55/290, 267, 431, 351, 55/400

[56] References Cited

U.S. PATENT DOCUMENTS

| 407,949 | 8/1889 | Case | 55/290 |
|---|---|---|---|
| 1,002,618 | 9/1911 | Winkler | 55/290 |
| 1,860,697 | 5/1932 | Traviss | 55/290 |
| 2,474,478 | 9/1945 | Hart, Jr. | 55/290 |
| 2,795,291 | 6/1957 | Pierce | 55/290 |
| 2,823,656 | 9/1954 | Dolza | 123/119 |
| 3,002,585 | 10/1961 | Pasturczak | 55/290 |
| 3,155,473 | 9/1961 | McNeil | 55/294 |
| 3,816,981 | 6/1974 | Carnewal et al. | 55/267 |
| 3,837,149 | 9/1974 | West et al. | 55/269 |
| 3,937,149 | 9/1974 | West et al. | 55/290 |
| 4,233,040 | 11/1980 | Vogelaar et al. | 55/269 |
| 4,299,603 | 11/1981 | Friesen | 55/290 |

FOREIGN PATENT DOCUMENTS

| 2841052 | 9/1979 | Fed. Rep. of Germany . |
| 8400271 | 3/1985 | PCT Int'l Appl. . |
| 1337690 | 3/1972 | United Kingdom . |

Primary Examiner—Bernard Nozick
Attorney, Agent, or Firm—Larry W. Miller; Frank A. Seemar; Darrell F. Marquette

[57] ABSTRACT

An air filtering mechanism for use on crop harvesting machinery having a generally cylindrical, rotary, perforate filter element, a fan operable to draw air therethrough, drive means operable rotatably to drive the filter element, and blanking off means mounted within the filter element for blanking off the perforations thereof over a predetermined region, is disclosed wherein a duct having an open portion is provided exteriorly of the filter element opposite to the blanking off means, A pressurized flow of air from the fan is directed through the duct in the form of a cleaning air blast in a direction parallel to the external surface of the filter element to clean foreign matter collected on the filter element in the region of the blanking off means by virtue of the filter element being exposed to the pressurized air in the duct along the open portion thereof. The foreign matter is conveyed through the duct by the cleaning air blast to a discharge portion for discharge thereof at a location remote from the air filter.

6 Claims, 5 Drawing Sheets

AIR FILTERING MECHANISM

BACKGROUND OF THE INVENTION

This invention relates generally to an air filtering arrangement which can be applied to many different devices which have to operate in an atmosphere which contains foreign matter, such as dust, chaff, short straw particles, etc. and in which air from this atmosphere has to pass through relatively small openings in an element of the filtering arrangement to hold back this foreign matter and, more particularly, to a mechanism for cleaning the foreign matter from the external surface of the filtering element to prevent the openings from being blocked.

Such an air filtering arrangement can, for example, be used with cooling devices for combustion engines or hydraulic equipment particularly in conjunction with cooling devices for the combustion engines on harvesting machines, such as combine harvesters. These machines normally work in a very dusty atmosphere as they can only harvest efficiently when the crop is ripe and dry which causes during operation, a considerable amount of dust, chaff and short straw particles to be displaced in the vicinity of the machine. While the use of a filter element prevents this foreign matter from reaching the device being cooled, such as the radiator through which the coolant for a combustion engine flows, it is necessary to prevent that same foreign matter from blocking the filter element itself and thereby interrupting the flow of air to the cooling device and causing overheating.

Known prior art, such as U.S. Pat. No. 407,949, provides an air filter having a filter element through which air is drawn by a first fan, and a second fan for blowing air into an air box which itself has an elongated outlet directing air into the interior of the filter element in a direction opposite to the direction of flow of air which the first fan draws through the filter element to blow away any foreign matter which has collected thereon. This known arrangement is relatively cumbersome in routing the cleaning air through the interior of the filter and furthermore, suffers from the disadvantage that foreign matter blown from the filter element, is discharged generally in the region of the filter element such that it tends to be immediately redeposited on the filter element by the flow of air drawn through the latter by the first fan. A similar mechanism is disclosed in U.S. Pat. No. 3,155,473; however, a single fan is provided on the engine block that is being cooled. On the pressure side of this fan, there is provided a collector which allows air under pressure to be collected and transmitted through a duct to the filtering element.

It is also known to remove foreign matter from a rotary filter element by relying solely on gravity and centrifugal forces. Such an arrangement is disclosed in GB-A-No. 1387690. In this arrangement, the filter element is rotatably mounted and on the side thereof opposite to that through which air enters the filter element, there is provided a stationary means such as a plate, which serves to blank off a given area of the filter element as the latter rotates. Thus, any foreign matter collected on the area blanked off by the plate at any given instant is no longer held by the flow of air through the filter element and can thus fall free of the latter under gravity and centrifugal forces.

With this known arrangement as applied to combine harvesters, for example, it has been found desirable to rotate the filter element in a particular given combination at a relatively high rotational speed, such as 450 RPM, in order to achieve satisfactory cleaning. In other words, the faster the rotational speed of the filter element is, the greater the efficiency is in the removal of foreign matter from the filter element. However, the faster the filter element is rotated, the less efficient the filter becomes in allowing cooling air to flow therethrough. Accordingly, the faster the rotational speed of the filter element is, the smaller the cooling effect is of the overall cooling system to which the filter element is fitted. In other words, contradictory requirements exist. To improve the foreign matter removal efficiency, the rotary air filter speed should be increased, while that this same speed should be decreased for improving the cooling efficiency.

While such a rotary air filter of particular dimensions has been found satisfactory with engines of horsepower in the range of 200 HP, it also has been found necessary to improve the overall efficiency of the cooling system without resorting to the obvious expedient of increasing the size of the radiator through which flows the coolant for an internal combination engine of a combine harvester, for example, when higher horsepower engines are used, as is becoming more often the case. Any increase in radiator size not only increases the cost but also presents a problem of finding sufficient room to accomodate such a component.

Similarly, a rotary air filter of larger dimensions possibly could match with the higher engine horse power rates but, in combine harvesters, this has become impractical as insufficient room is available to accomodate such a larger component.

SUMMARY OF THE INVENTION

According to the present invention, there is provided an air filtering arrangement having a perforate filter element, a fan operable to draw air to be filtered through said filter element whereby foreign matter is collected theron, and a source of pressurized air for providing, in use, a filter element cleaning air blast for removing foreign matter collected on the filter element in which the filter element cleaning air blast is oriented generally parallel to and closely adjacent a section of the filter element at the side thereof upon which foreign matter is collected, the cleaning air blast being operable to remove foreign matter from said section in said parallel direction and to discharge the removed foreign matter remote from the filter element and the relative position of the filter element and the cleaning air blast, in use, being varied generally parallel direction relative to and closely adjacent said section of the filter element in a manner so that the pressurized air flow through the duct means removes foreign matter collected on the filter element by virtue of the latter being exposed to said pressurized air flow in the duct means through the open portion thereof. When used in combination with the blanking off means, the duct means are open in the region of said blanking off means for exposing the filter element to the pressurized air of the filter element cleaning air blast in said region of the blanking off means. The duct means preferably have a discharge portion extending away from the filter element to discharge foreign matter remote from the filter element.

The present invention lends itself to application in a rotary filter such as disclosed in GB-A-No. 1387690 in that the rotational speed of the filter element can be reduced considerably, thus increasing the flow of air therethrough and hence the cooling efficiency thereof, because special steps are taken to clean the filter element of foreign matter collected thereon by the provision of the duct means and pressurized air flowing therethrough. It has been found that the previous rotational speed of 450 RPM of a particular filter element can be reduced to around 100 RPM or lower and that this gives an improvement of the order of 20% in the cooling effect of the overall system. This order of improvement is sufficient for the basically same cooling system to be used for engines of increased horse power. This reduction in the rotational speed of the air filter gives rise to a further advantage in that it reduces the power consumption. Still a further reduction in power consumption can be effected by dispensing with a separate mechanical drive for the filter element. It has been found that the lower rotational speed of the filter element which can now be accepted, can be readily obtained by relying on the turbine effect of the air flowing through the filter element as drawn by the fan. Accordingly, the filter element is preferably provided with turbine blades on the interior thereof in order to effect rotational drive of said filter element.

This fan may also be used as the source of pressurized air, one end of the duct means merely being arranged adjacent the pressure side of said fan. However, a separate source of pressurized air of course also may be provided. In order to ensure the proper flow of foreign matter collected by the pressurized air through the duct means, it is preferable to enlarge the "mouth" of the duct at the inlet end of the discharge portion of the air duct in order to reduce, if not eliminate, the likelihood of foreign matter hooking around the open edge of that mouth with the possible result of a gradual build-up of such material and hence blockage of the duct in due course. It is particularly advantageous to employ this feature of the present invention in the context of harvesting machines where there is always a problem of the short pieces of straw, leaves or other stem material hooking around edges of components in their path.

The fact that the foreign material removed from the filter element, is conveyed through the duct means for discharge remote from the filter element, gives rise to a further important advantage of the present invention. This is because in all known prior arrangements, the foreign material has always been discharged in the general vicinity of the filter element and hence, in the general flow of air being drawn through the filter element. As a result this foreign material often is virtually immediately redeposited on said filter element. It is considered that it is desirable to discharge foreign material from the filter element by a distance of at least one meter whereby this foreign material is not likely to be redeposited on the filter element anymore. This remote discharge of foreign material is readily accomplished by the present invention.

The perforated area of the filter element may be on its periphery or on its end surface, or indeed both, provided duct means are employed in association with both regions.

BRIEF DESCRIPTION OF THE DRAWINGS

The air filtering mechanism in accordance with the present invention will now be described in greater detail in the context of combine harvesters and with reference to the accompanying drawings wherein.

DETAILED DESCRIPTION OF THE PREFERRED EMBODIMENT

Figure 1:
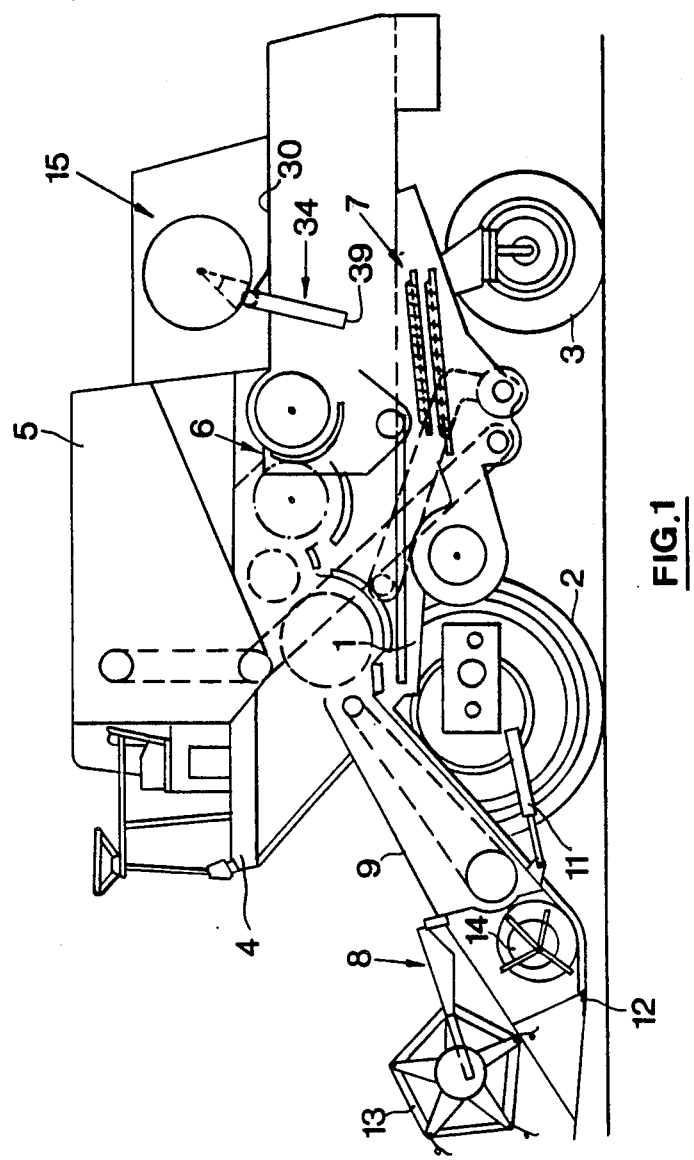
FIG. 1 is a schematic side view of a combine harvester showing the provision of an air filtering arrangement in accordance with the present invention.

Referring first to FIG. 1, the combine harvester on which the air filtering arrangement of the present invention is applied, is of generally known form and comprises a main chassis or frame 1 supported on a front pair of drive wheels 2 and a rear pair of steerable wheels 3. Supported on the main chassis 2 are an operator's platform 4, a grain tank 5, a threshing and separating mechanism indicated generally at 6, a grain cleaning mechanism indicated generally at 7, and an engine (not shown). A conventional header 8 and straw elevator 9 extend forwardly of the main chassis 1 and the header is pivotably secured to the chassis for generally vertical movement which is controlled by extensible hydraulic cylinders 11.

Figure 2:
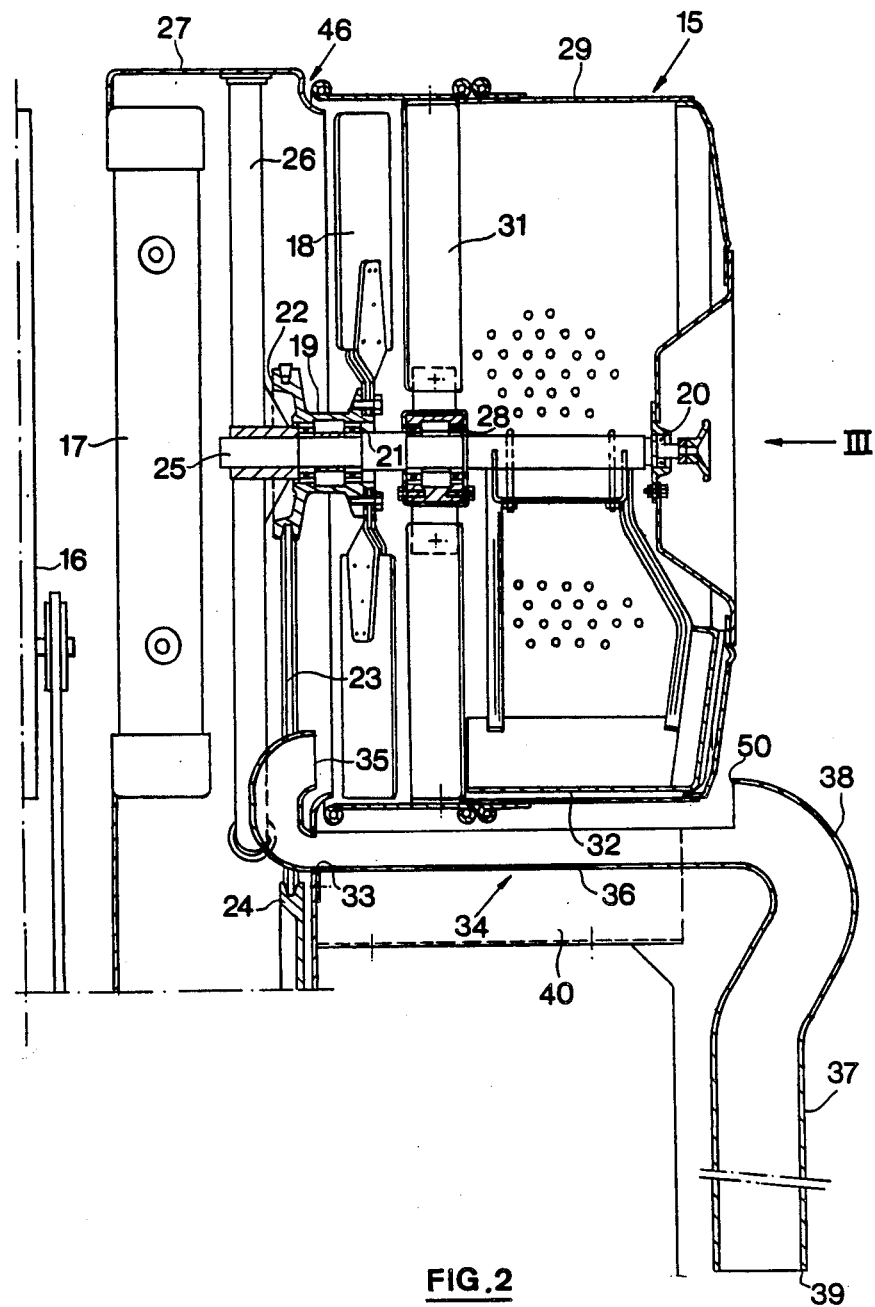
FIG. 2 is a sectional view of the cooling system of the combine harvester of FIG. 1.
Figure 3:
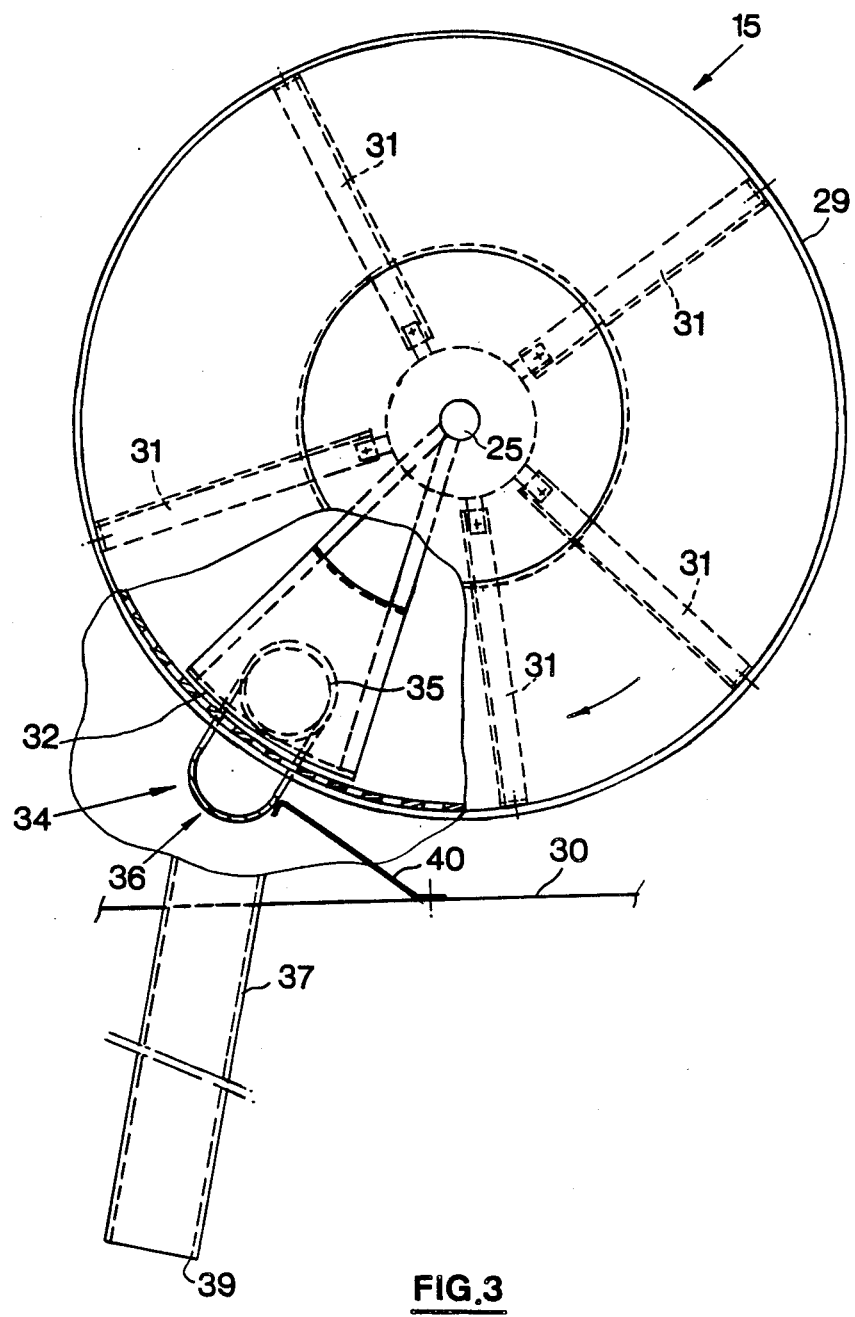
FIG. 3 is a front view, partially in section, of FIG. 2, corresponding to arrow III of FIG. 2.

As the combine harvester is propelled forwardly over a field with standing crop, the latter is severed from the stubble by a sicklebar 12 on the header 8, whereafter a reel 13 and a header auger 14 convey the cut crop to the straw elevator 9 which supplies it to the threshing and separating mechanism 6. The combine harvester further includes a rotary air filter or screen indicated generally at 15 and illustrated in greater detail in FIGS. 2 and 3 of the drawings. Referring now to FIGS. 2 and 3, the rotary air filter 15 forms part of a cooling system for the interal combustion engine of the combine harvester of which only the engine block 16 is illustrated schematically in FIG. 2. The cooling system comprises a radiator 17 which is disposed with the engine block 16 on the side thereof and with a cooling fan 18 on the opposite side thereof. The cooling fan 18 is mounted on one end of a collar 19 with the other end of the collar 19 being provided with a pulley 22 which is driven by a belt 23 from a further pulley 24 in order to impart rotational drive to the cooling fan 18. To this end the collar 19 is mounted for rotation, via bearings 21, on a stationary shaft 25 which itself is supported via a support frame 26 provided in a radiator housing 27.

The rotary air screen of filter 15 is mounted for rotation on said shaft 25 via bearings 20 and 28 and comprises a filter element 29 in the form of a cylinder which is open at one end facing the radiator 17 and which is closed at the opposite end. The fan 18 is mounted within the cylindrical filter element 29 adjacent its open end. The filter element 29 is imperforate at its closed end but perforate around its periphery for at least a portion of its axial length. Rotation of the filter element 29 is effected by five turbine blades 31 disposed within the filter element 29 towards the open imperforate end thereof; these blades 31 being acted upon by the flow of cooling air drawn through the filter by the cooling fan 18, thus rotating the filter at a relatively low rotational speed, preferably less than 150 RPM.

A stationary blanking off plate 32 is provided within the filter element 29 on the aforementioned shaft 25 in a manner so as to be closely adjacent a region of the perforate periphery of the filter element 29. It will be seen from FIG. 3 that, in a preferred embodiment, this plate 32 extends over an arc of approximately 30 degrees, thus preventing cooling air from flowing through the filter element 29 over that arc at the perforate periphery thereof. Accordingly, any dust, chaff and short particles of straw or other foreign matter collected on the air screen at that blanked off portion in use of the air filtering arrangement tends to fall loose of the filter element due to gravity forces and, at least partially, to centrifugal forces whereafter this foreign matter can readily be removed. To this end, a pneumatic foreign matter evacuation system is provided.

This evaluation system comprises an opening 33 provided in the radiator housing 27 adjacent the lower end of the filter element 29 and through which there is disposed one end of duct means 34 which is curved so that the open end 35 thereof is directed towards, and positioned adjacent, the pressure side of the cooling fan 18 to provide a source of pressurized air which flows through the duct 34. A portion 36 of the duct means 34 extends closely beneath the filter element 29 and continues generally at right angles over a discharge portion 37 through the intermediary of a curved transition portion 38. The portion 36 of the duct 34 is open at its top, this open portion extending for the full axial length of the filter element 29, as can be seen in FIG. 2. The portion 36 of the duct 34, as shown in the drawings, is of semi-circular cross-section, although this is not essential.

Alternative arrangements are possible and, as a matter of fact, the portion 36 of the duct means 34 preferably has a shallow, generally rectangular cross-section with the shorter dimension thereof extending generally perpendicularly to the cylindrical filter element 29. The longer side of this cross-section even may be slightly curved to extend generally concentrically with the cylindrical filter element 29. The discharge end 39 of the discharge portion 37 is disposed as far away from the rotary air filter as possible, desirably this being at least a distance of one meter. This discharge portion 37 conveniently may be provided in the space between the combine chassis 1 and shieldings attached thereto at a distance therefrom. Preferably the discharge portion 37 is directed downwardly towards the ground to discharge the foreign matter close to the ground.

In operation, polluted air is drawn in through the filter element 29 by the fan 18. Foreign matter such as chaff, short pieces of straw, etc., is held back on the perforate surface of the filter element 29 where it tends to stick due to the high suction forces generated by said fan 18. The filtered air is urged across the turbine blades 31, causing the filter element 29 to rotate, and finally through the radiator 17 and around the engine block 16. The rotational speed of the filter element deliberately is kept fairly low as high speeds greatly reduce the volume of cooling air drawn therethrough by any given fan and fan speed.

With the blanking off plate 32 locally interrupting the flow of cooling air through the filter element 29 as it is rotated past said plate 32, foreign matter accumulated on the perforate surface of the filter element 29 tends to fall loose thereof due to gravity forces and eventually also due to centrifugal forces. However, it has been experienced that, in combination with high power engines and accordingly dimensioned cooling fans, this is not sufficient for the foreign matter to be discharged and kept away from the rotary air screen. Instead the foreign matter is sucked up again and sticks again to the perforate surface of the filter element 29, after passing the blanking off plate 32. Under these conditions the rotary air screen tends to choke up causing the cooling efficiency to be greatly reduced.

This problem has been solved with the present invention following which the air duct means 34, as described above, has been provided in the immediate vicinity of the filter element 29 in the region of the blanking off plate 32. Foreign matter that has accumulated on the perforate surface of the filter element 29 and that tends to fall loose beneath the blanking off plate 32 in a manner as already described, is picked up by a localized pressurized air flow and discharged thereby at a remote location from the rotary air screen. This localized air flow is directed generally parallel to and in the immediate vicinity of the perforate surface of the filter element in the region of the blanking off plate 32. In other words, this pressurized air flow does not pass through the perforations of the filter element 29 to clean it.

As described above, this pressurized air flow may be generated by the cooling fan 18 and is captured in the curved inlet end 35 of the duct means 34. This pressurized air flow is urged through the duct portion 36 with the open top and finally through the discharge portion 37 towards the ground. It is by virtue of the perforate surface of the filter element 29 in the region of the blanking off plate 32 being exposed to the pressurized air in the duct means 34 through the open portion thereof, and in part due to the pressure differential created thereby, that foreign matter, collected on said perforate surface, is removed therefrom by the pressurized air flow, whereafter discharging the removed foreign matter remote from the filter element 29 has become easy.

A deflector plate 40 is connected to one longitudinal edge of the open top of the duct portion 36 and extends downwardly to an adjacent wall or shielding 30 of the combine harvester disposed immediately beneath the rotary air filter 15. The filter element 29 is arranged to rotate in a clockwise direction, as seen in FIG. 3, and the deflector plate 40 serves to help guide any foreign material collecting on the wall or shielding 30 towards the open top of the duct portion 36, this movement being encouraged by the rotary movement of the filter element 29. Accordingly, not only is foreign matter removed from the filter element 29 itself but also from the relatively closed area or region beneath the rotary filter which is important as otherwise foreign matter tends to build up thereon, which is undesirable from the standpoint of maintaining the filter element 29 as clean as possible.

It will be seen from FIG. 2 that the cross-sectional area of the discharge portion 37 of the duct 34 is larger than the cross-sectional area of the portion 36, whereby the free edge 50 of the "mouth" of the upstream end of the discharge portion 37 overlaps the end of the filter element 29 such that this edge 50 is shielded from the foreign matter entrained in the air flowing through discharge portion 37 of the duct. Accordingly, this much reduces the possibility of any of that foreign matter, especially short straw particles or leaves from hooking round the edge 50 of that mouth and causing a blockage.

Figure 4:
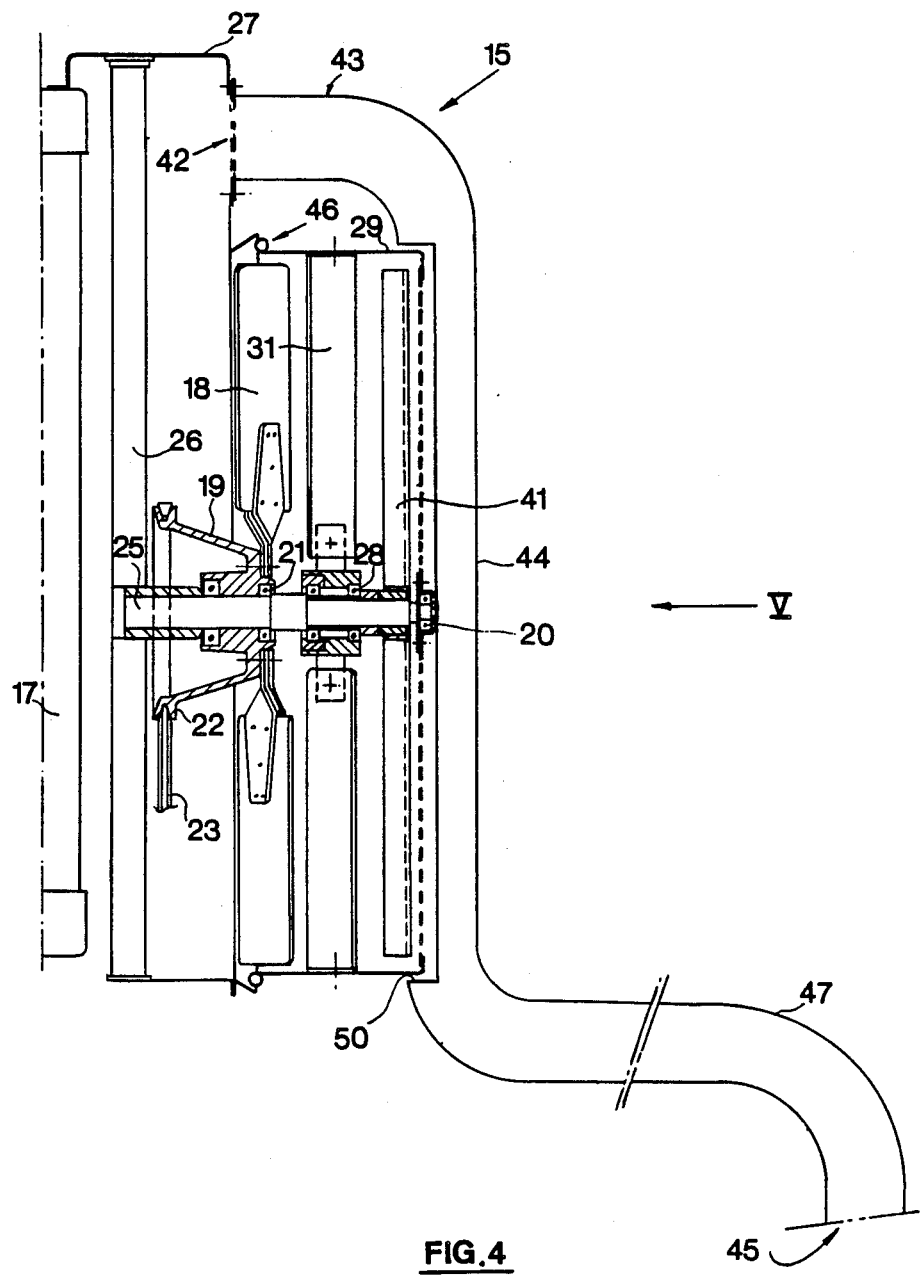
FIG. 4 is a view similar to FIG. 2 but showing an alternative embodiment.
Figure 5:
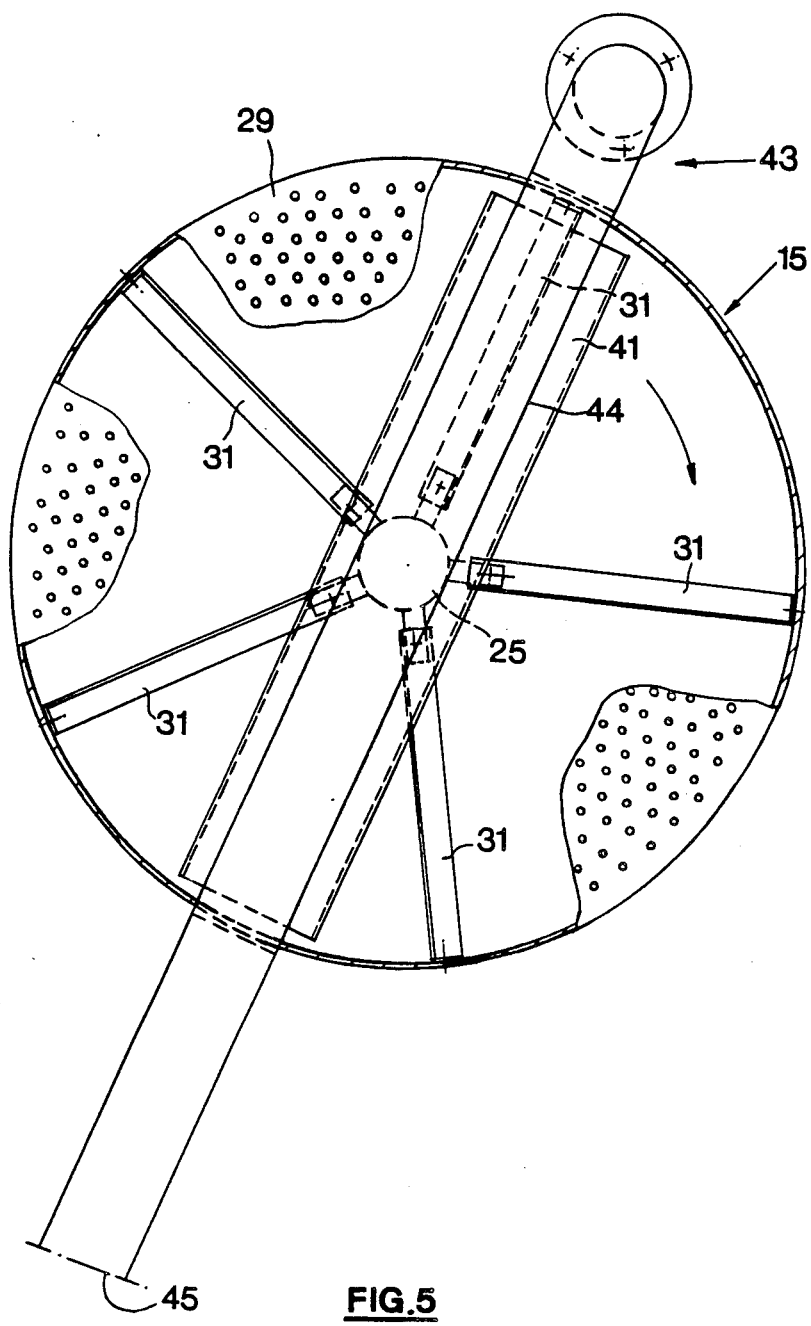
FIG. 5 is a view in the direction of arrow V of FIG. 4 with certain components being broken away.

Turning now to FIGS. 4 and 5 of the drawings, an alternative embodiment is shown in which the axial length of the filter element 29 is reduced and the filter element is perforated over its closed end as opposed to around its periphery which is in this embodiment imperforate. The reduction in the axial length of the filter element 29 makes the overall cooling system much more compact which is an advantage as space is always at a premium in combine harvesters. Furthermore, the reduced axial length of the rotary filter means that the latter no longer has to be removed for transport purposes; such removal being necessary at present when the machine has to go by rail because the tunnels through which the trains have to pass are such that they would be fouled by the air filter and thus, to avoid any possible damage, the latter has to be removed. This is a time-consuming operation at both ends of the journey and sometimes, re-assembly is not always effected correctly so that it is a particular advantage not to have to adopt this procedure.

The stationary blanking off means in this embodiment is in the form of a generally rectangular blanking off plate 41 disposed inside and diametrically of the cylindrical air filter element 29, and is fixed on the shaft 25. The filter element 29 is rotatably mounted on that shaft 25 via bearings 20, 28 as in the first embodiment. Also, the cooling fan 18 is rotatably mounted on the shaft 25 and driven by a belt and pulley arrangement 23, 22, as before.

In order to effect removal of foreign matter in this embodiment, an outlet 42 is provided in the radiator housing 27 at the top thereof. This outlet 42 commumicates with one end of an air duct 43 which extends generally parallel to the shaft 25 until it reaches the front of the filter element 29 whereafter it curves downwardly and centrally across the front or closed end of the filter element 29. This air duct 43 is open over a portion 44 which spans the filter element, i.e. over a diameter of the latter. The duct 43 continues downwardly and has a discharge portion 47 terminating in a discharged end 45 remote from the air filter 15, again the desired minimum distance between the filter element 29 and the discharge end 45 being of the order of 1 meter.

With this embodiment, a diametral strip of the closed, perforate end of the filter element 29 is cleared of foreign matter as pressurized air flows through the duct 43. It will be noted that in this embodiment, the inlet end of the duct 43 adjacent the radiator housing 27 is not returned so as to face the cooling fan 18. This is because in some circumstances, the static pressure in the radiator housing 27 will be sufficient for air to flow through the duct at a rate adequate to effect efficient cleaning of the filter element 29 and removal of the foreign matter. In other circumstances, this static pressure may have to be augmented by dynamic pressure which is achieved by providing a deflector or the like adjacent the outlet from the radiator housing, such as by turning the end of the air duct 43 as in the embodiment of FIGS. 2 and 3.

In both of the illustrated embodiments, a pneumatic seal is provided between the radiator housing 27 and the filter element 29 by way of these two components being spaced from each other at the pressure side of the fan 18 as indicated at 46 in both FIGS. 2 and 4, this space allowing some of the pressurized air within the radiator housing 27 to escape and thus serve to prevent any dust laden, or otherwise contaminated, air to enter the cooling system.

The rotational speed of the cooling fan 18 in the known arrangements has been of the order of 2,500 RPM, but with the present invention, this has been reduced by several hundred RPM in view of the fact that it is easier to draw air through the filter element 29 in view of the lower rotational speed thereof as already explained. Furthermore, this reduction in fan speed makes a significant reduction in the noise level, as well as a reduction in the power consumption. The noise reduction is a distinct advantage from the standpoint of operator comfort.

It will be seen that the present invention provides a rotary air filter which has a plural number of advantages. Indeed, and most importantly, foreign matter collected on the filter element is positively blown therefrom and then positively conveyed away from the vicinity of the filter element so as to avoid the immediate redeposition thereof on the filter element. Accordingly the risks for choking of the filter element and consequent overheating of the engine have been greatly reduced. At the same time, this positive and definitive removal of foreign matter has enabled a substantial reduction of the rotational speed of the filter element, whereby it has become much easier for the fan to draw cooling air through the filter element. This in turn again has enabled a substantial reduction of the cooling fan RPM which is advantageous for the power reduction as well as the noise reduction which is desired therefrom. On top of all this, the reduced fan and air screen RPM's also reduce vibrations on the one hand and improve the mechanical durability on the other hand. Alternatively, the same fan speed could be maintained which would result in a more efficient cooling, respectively a much larger cooling capacity.

Also the number of components and hence the cost are reduced when the filter element is driven using the turbine principle as opposed to a positive mechanical drive. Finally, the filtering arrangement according to the invention can be made much more compact for a given engine power, which is a great advantage especially when installed on combine harvesters.

It will be understood that changes to the details, materials, steps and arrangement of parts which have been described and illustrated to explain the nature of this invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention.

One skilled in the art will readily realize an important aspect of the invention is that a filter element cleaning air blast is oriented generally parallel to and closely adjacent a section of the filter element at the side thereof upon which foreign matter is collected, the cleaning air blast being operable to remove foreign matter from said section in said parallel direction and to discharge the removed foreign matter remote from the filter element. Furthermore, the relative position of the filter element and the cleaning air blast, in use, should be varied such that other sections of the filter element successively are exposed to the pressurized air of the filter element cleaning air blast for cleaning.

It thus is very well conceivable that, in a further alternative arrangement, the discharge portion 37, 47 of the duct means 34, 43 can be left out, provided the flow of pressurized air in the open top portion 36, 44 of the duct means 34, 43, when issuing from said portion, is sufficiently powerful and oriented so as to discharge removed foreign matter at a location sufficiently remote from the filter element 29 so as to avoid said foreign matter from being redeposited back on the filter element 29 after discharge.

Taking this still one step further, it is even possible to leave out the open top portion 36, 44 of the duct means 34, 43. Indeed, all what matters is that a section of the filter element 29 is exposed to a sufficiently powerful flow of pressurized air along the surface thereof so as to remove foreign matter collected thereon in said direction. Accordingly, in a further alternative arrangement, a concentrated and powerful air jet is directed generally along the surface of a section of the filter element 29 in a manner so as to expose said surface thereto, whereby foreign matter, previously collected on said surface, is removed therefrom for discharge at a location remote from the filter element 29.

In all the alternative arrangements described so far, the flow of cooling air through the filter element is interrupted by mechanical means, i.e. a blanking off plate 32, at the location where accumulated foreign matter is removed from the filter surface. This obviously greatly facilitates the removal of said foreign matter. Yet, this mechanism could be operable without the use of this blanking off plate 32. However, for an arrangement without the blanking off plate to operate satisfactorily, it will be necessary for the filter element cleaning air blast to be even more powerful so that this cleaning air blast additionally provides the effect of the blanking off plate, i.e. the interruption of the flow of air to be filtered through the filter element at the section thereof exposed to the cleaning air blast. To the extent that this cleaning air blast, which is directed at a right angle to the intended direction of flow of air to be filtered through the filter element, can eliminate said flow of air to be filtered at the section of the filter element exposed to the cleaning air blast, the removal of foreign matter will be made easier.

It will also be appreciated that it is not essential for the filter element to be rotated and the filter element cleaning air blast to be stationarily positioned. To effect a cleaning of the entire filter, it is sufficient that the relative position of the filter element and the cleaning air blast, in use, are varied. Following a further alternative embodiment of the invention, the filter element may be provided stationarily with the filter element cleaning air blast being movable relative to the filter element such that all sections of the filter element, in use, successively are exposed to the pressurized air of the filter element cleaning air blast. In the event a blanking off plate also is provided, this plate should be movable in unison with the cleaning air blast across the entire surface of the filter element and in such a manner that, at all times, the cleaning air blast and the blanking off plate are positioned opposite to each other at opposite sides of the filter element.

In the arrangements shown in the drawings, the cooling fan is a so-called pusher fan which is provided forwardly of the radiator as seen in the direction of flow of the cooling air through the radiator and whereby it has become possible to provide a pneumatic seal 46 beteen the rotary air filter 29 and the stationary radiator housing 27 to the extent that this seal 46 could be provided at the pressure side of the fan. This is especially advantageous in combination with high speed rotary air screens as indeed mechanical seals in such combinations tend to wear too fast. However, because with the instant invention the filter element either is rotated at a much lower speed or even is stationary, a mechanical seal again can advantageously be used. This in turn means that the pusher type cooling fan may be replaced by a more conventional suction type cooling fan installed at the opposite side of the radiator, which may represent a cost reduction.

Having thus described the invention, what is claimed is:

1. An air filtering mechanism for use on mobile equipment comprising:
    a perforate filter element having an external surface and being rotatably mounted on said mobile equipment;
    drive means for rotatably moving said filter element during operation of said mobile equipment;
    a fan operable to draw air through said filter element, said air bearing foreign matter which is restrained by said filter and retained on said external surface by the flow of air effected by said fan passing through said perforate filter element;
    duct means provided adjacent said filter element, said duct means having an inlet adjacent the downstream pressure side of said fan so that filtered air flows through said duct means along said external surface of said filter element, said duct means further having an open portion directed towards said filter element adjacent said external surface, the duct means being operable to channel a cleaning air blast in a generally parallel direction relative to and closely adjacent said external surface so that the cleaning air blast through the duct means removes foreign matter collected on the filter element by virtue of the external surface of said filter element being exposed to said cleaning air blast in the duct means through the open portion thereof; and
    a baffle provided closely adjacent the filter element along an internal surface thereof for blanking off the perforations thereof over a predetermined region so as to obstruct the passage therethrough of air to be filtered, the baffle being stationary and being positioned directly opposite to said open portion of said duct means such that successive sections of the filter element are blanked off along the internal surface thereof by the baffle during rotation of said filter element.

2. The air filtering mechanism according to claim 1 wherein the filter element is mounted for rotation about an axis of rotation, said filter element being cylindrical and having a perforate external surface extending generally perpendicularly to the axis of rotation thereof, said duct means further including a discharge portion operable to discharge said foreign matter remotely from said open portion.

3. The air filtering mechanism according to claim 2 wherein said blanking off means and the open portion of said duct means extend diametrically across the perforate external surface of the filter element.

4. The air filtering mechanism according to claim 3 wherein said discharge portion of the duct means has a larger cross-sectional area than said open portion, said discharge portion having an edge adjacent to and overlapping said external surface of the filter element.

5. The air filtering mechanism according to claim 4 wherein said drive means for driving the filter element comprises turbine blades coupled to said filter element so that said filter element is driven by the flow of air therethrough induced by the fan.

6. The air filtering mechanism according to claim 5 wherein said mobile equipment is a crop harvesting machine.

* * * * *